US006636898B1

(12) United States Patent
Ludovici et al.

(10) Patent No.: US 6,636,898 B1
(45) Date of Patent: Oct. 21, 2003

(54) SYSTEM AND METHOD FOR CENTRAL MANAGEMENT OF CONNECTIONS IN A VIRTUAL PRIVATE NETWORK

(75) Inventors: David S. Ludovici, Owego, NY (US); Mark J. Melville, Endwell, NY (US); Richard A. Mullock, Endwell, NY (US); Frank V. Paxhia, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,483

(22) Filed: Jan. 29, 1999

(51) Int. Cl.[7] .............................................. G06F 15/16
(52) U.S. Cl. ....................... 709/250; 713/201; 709/227; 709/228; 709/229
(58) Field of Search ...................... 713/201; 709/201, 709/227–229, 250, 311–332

(56) References Cited

U.S. PATENT DOCUMENTS

| 5,345,502 | A |   | 9/1994 | Rothenhofer | 379/207 |
|---|---|---|---|---|---|
| 5,432,783 | A |   | 7/1995 | Ahmed et al. | 370/60.1 |
| 5,432,785 | A |   | 7/1995 | Ahmed et al. | 370/60.1 |
| 5,621,727 | A |   | 4/1997 | Vaudreuil | 370/60 |
| 5,623,492 | A |   | 4/1997 | Teraslinna | 370/397 |
| 5,706,279 | A |   | 1/1998 | Teraslinna | 370/232 |
| 5,761,201 | A |   | 6/1998 | Vaudreuil | 370/392 |
| 5,768,271 | A |   | 6/1998 | Seid et al. | 370/389 |
| 5,812,525 | A |   | 9/1998 | Teraslinna | 370/397 |
| 5,835,724 | A | * | 11/1998 | Smith | 709/227 |
| 5,835,726 | A |   | 11/1998 | Shwed et al. | 395/200.59 |
| 6,055,575 | A | * | 4/2000 | Paulsen et al. | 709/229 |
| 6,061,796 | A | * | 5/2000 | Chen et al. | 713/201 |
| 6,079,020 | A | * | 6/2000 | Liu | 713/201 |
| 6,173,399 | B1 | * | 1/2001 | Gilbrech | 713/153 |
| 2002/0055989 | A1 | * | 5/2002 | Stringer-Calvert et al. | 709/220 |

OTHER PUBLICATIONS

Stern,Morgan, Extend Your Net with VPNs,BYTE Magazine, Nov. 1997, entire document.*
Loshin,Pete, Extranets Reach the Spotlight,BYTE Magazine, Jan. 1998, entire document.*
Stonesoft Corp., "VPN Client Installation and User Guide", 2001, Stonesoft Corp., Version 2.0, entire document.*
Hilton, Scott W., "Adding the 'N' to Virtual Private Networking", 2/99, Horizon House Publications, pp. 43–44.*
Greene, Tim, "VPNs are easy–once you get the clients installed", May 31, 1999, Network World, Inc.,p. 28.*
Snyder, Joel, "Maturity brings a new face to IPSec VPN products", Oct. 28, 2002,Network World, Inc.,p. 51.*

* cited by examiner

Primary Examiner—Gail Hayes
Assistant Examiner—Ronald Baum
(74) Attorney, Agent, or Firm—Shelley M. Beckstrand

(57) ABSTRACT

A single point of control is provided for all IPSec tunnels and also for VPN connections at a node within a virtual private network. The control of the connections include the ability to start and stop manual and dynamic VPN connections, to delete connections that might have had errors associated with them, to query VPN connection status information on these connections, to manage such things as connection lifetimes, and the refresh of keying material, that is the re-negotiation of dynamic Security Associations (SAs), and to create VPN connections when this system is acting in a responder role, that is the opposite endpoint of an initiated connection.

16 Claims, 10 Drawing Sheets

SYSTEM AND METHOD FOR CENTRAL MANAGEMENT OF CONNECTIONS IN A VIRTUAL PRIVATE NETWORK

CROSS REFERENCES TO RELATED APPLICATIONS

U.S. patent applications Ser. No. 09/239,693, entitled System and Method for Managing Security Objects, Ser. No. 09/240,720, entitled "System and Method for Network Address Translation Integration With IP Security", Ser. No. 09/239,694, entitled "System and Method for Dynamic Micro Placement of IP Connection Filters", and Ser. No. 09/240,718, entitled "System and Method for Dynamic Macro Placement of IP Connection Filters", filed concurrently herewith are assigned to the same assignee hereof and contain subject matter related, in certain respects, to the subject matter of the present application. The above-identified patent applications are incorporated herein by reference.

BACKGROUND OF THE INVENTION

1. Technical Field of the Invention

This invention pertains to central management of connections in a system. More particularly, it pertains to central management of connections within Virtual Private Networks implementing IPSec and ISAKMP Internet security protocols.

2. Background Art

With the onset of network computing came the need to insure secure connections between networked computers. Usually companies resorted to establishing private networks to do this, and at considerable expense. However, as this trend of Network Computing continues to evolve, it is necessary to extend secure communications with in the enterprise and to utilize the public networks. Driving factors include the need for mobility, company mergers and acquisitions, and the usual "improving the bottom line". Virtual Private Networks (VPNs), in this context, allow customers to use existing private or public networks, including the Internet, to establish secure connections between other businesses, branch offices, and remote users.

One problem with VPNs is they are usually implemented via proprietary techniques, such that interoperability is limited to single vendor solutions. The IETF now has working groups and draft standards which will allow a more uniform VPN solution across vendors that implement to those standards. IP Security (IPSec) and Internet Security Association Key Management Protocol (ISAKMP) are examples of these standards and these are the standards used in the preferred embodiment of the invention.

Furthermore, the current state of the art establishes IPSec tunnels using these standards, however there is a requirement heretofore not met for providing systems the ability to manage connections established using these standards.

The creation of virtual private networks demands system security on those systems that act as IPSec connection endpoints. Without it, it is not possible to insure that the system isn't compromised in some way, and that the resulting IPSec tunnel or the VPN connection isn't compromised. Furthermore, for security reasons and connection manageability reasons, it is desireable the system have a single point of control for all IPSec tunnels and also for VPN connections. This single point of control needs to be able to, programmatically, control connections. The control of the connections include the ability to start and stop manual and dynamic VPN connections. It also needs to delete connections that might have had errors associated with them. For the purposes of interrogating VPN connection status on the system, it needs to provide the ability to query information on these connections. It also needs to manage such things as connection lifetimes, and the refresh of keying material, that is the re-negotiation of dynamic Security Associations (SAs). It should also provide the ability to create VPN connections when this system is acting in a responder role, that is the opposite endpoint of an initiated connection.

It is an object of the invention to provide a system and method for centrally managing connections in a virtual private network.

It is a further objective of the invention to provide a system and method for centrally managing VPN connections with the ability (a) to control access to the resources necessary to start the servers that manage VPN connections, and to control access in the management of those VPN connections; and (b) to start, stop delete and query defined VPN connections on the system, including the ability to discover which connections should be started in a variety of ways.

It is a further object of the invention to provide a system and method for establishing (starting) an active VPN connection in a plurality of ways, including VPN connections using IPSec technologies for protection of IP datagrams.

It is a further object of the invention to limit these VPN connections to a particular lifetime, and to refresh the keying material when VPN policy dictates it is time.

SUMMARY OF THE INVENTION

In accordance with the invention, there is provided a system and method for centrally managing connections in a virtual private network. A connection manager is selectively operable for managing, including starting, stopping, deleting, and querying, instantiated connections.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiment of the invention, a connection manager system and method is provided for managing connections centrally in a virtual private network (VPN), and is referred to as the virtual private network connection manager (VPNCNM).

VPN connections are described in copending patent application Ser. No. 09/239,693, entitled "System and Method for Managing Security Objects".

The VPNCNM is responsible for starting, stopping and deleting connections as required. It is also responsible for responding to queries for connection information, and for providing connection level control of expirations.

In accordance with the present invention, an object model is provided for the VPNCNM. This object model is implemented as a separate process or job and processes commands that are sent to it. A list of commands and the processing that occurs will be described hereafter. Once the VPNCNM is started, it builds the VPN manager object, and that object in turn builds the command shipper facade, connection manager, and alarm clock. The process then invokes the SteadyState( ) method on the VPN manager object. This method waits for commands to be delivered. If the commands are destined for a connection object, they are either delegated to the appropriate connection object if it exists, or a connection object is built and then the command sent to it. Each connection object has a reference to a state 'cstate' object. There are various state objects that exist, and a state model that describes the events that cause, and actions that take place during, state transitions.

The terms VPN manager, connection manager, VPN connection manager, and CM are used interchangeably and refer, in general, to the preferred embodiment of the invention which is an object-oriented design for creating the various objects needed to support the management of connections and security associations (SAs). Commands that the connection manager processes include: starting a connection, stopping a connection, responding to a query of connections, recording state changes (started, stopped, in process, etc.), reacting to threshold notifications (timer, byte count), and responding to externally initiated requests for service.

Figure 1:
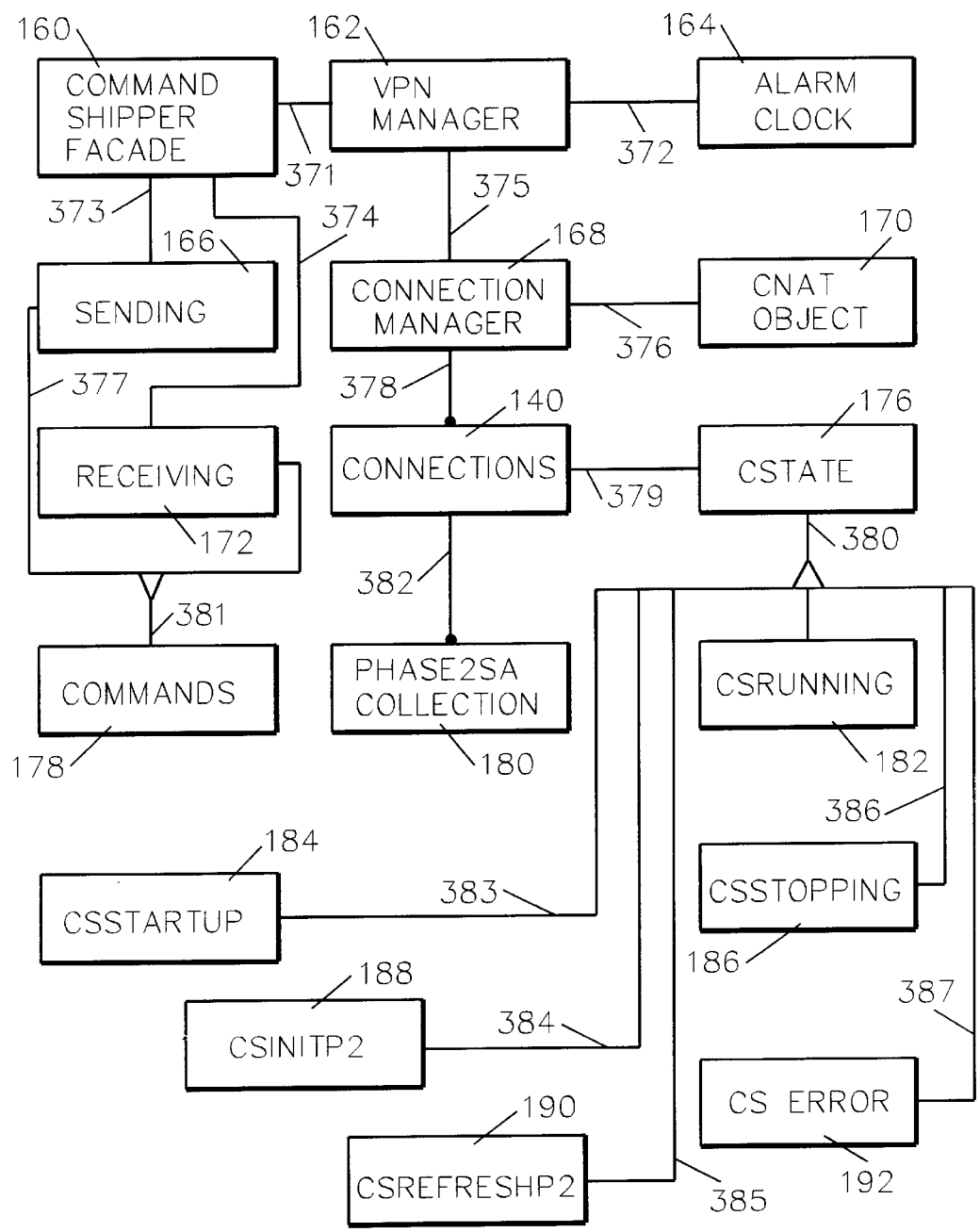
FIG. 1 is an object diagram of the preferred embodiment of the invention.
Figure 9A:
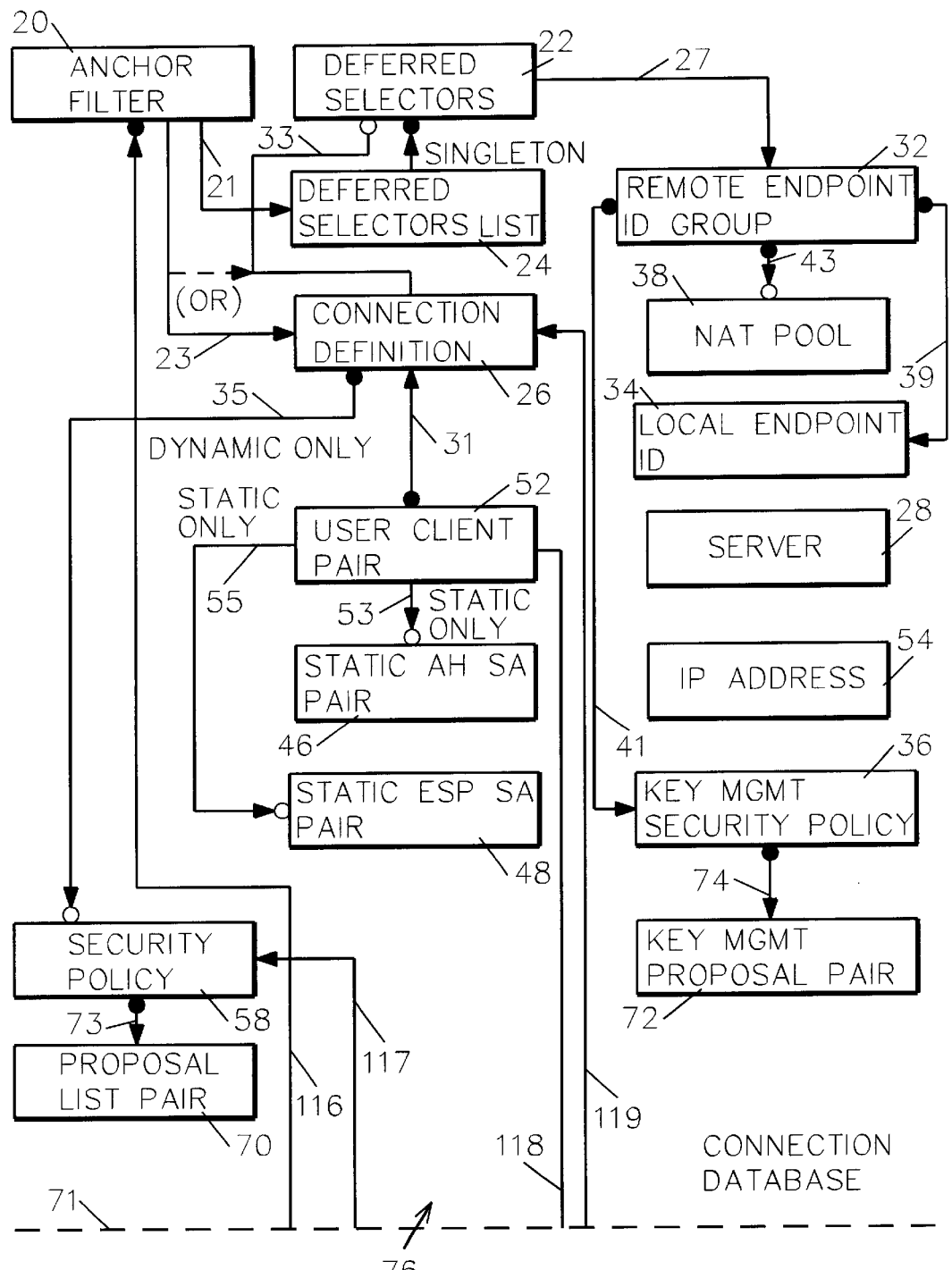
FIGS. 9A and 9B, arranged as shown in FIG. 9, illustrate in object notation the connection model of the preferred embodiment of the invention, including database information and instantiations the VPN manager 162 of FIG. 1.
Figure 9B:
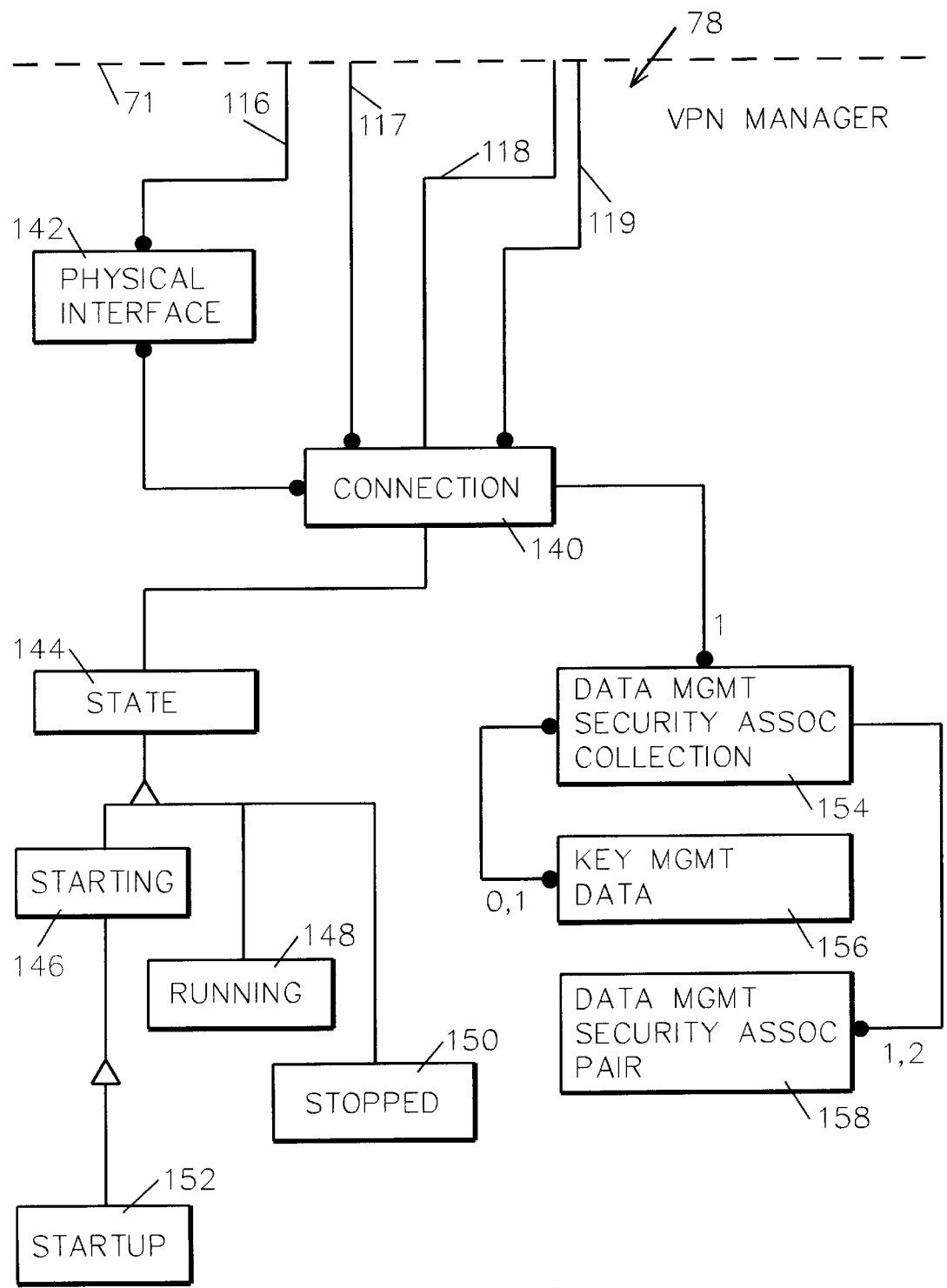
Figure 10:
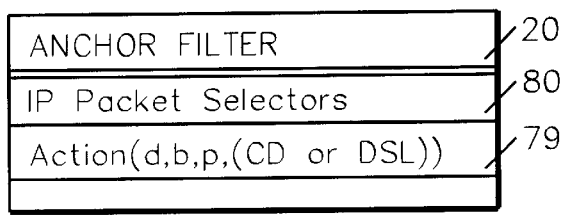
FIG. 10 illustrates the anchor filter object of FIG. 9.
Figure 11:
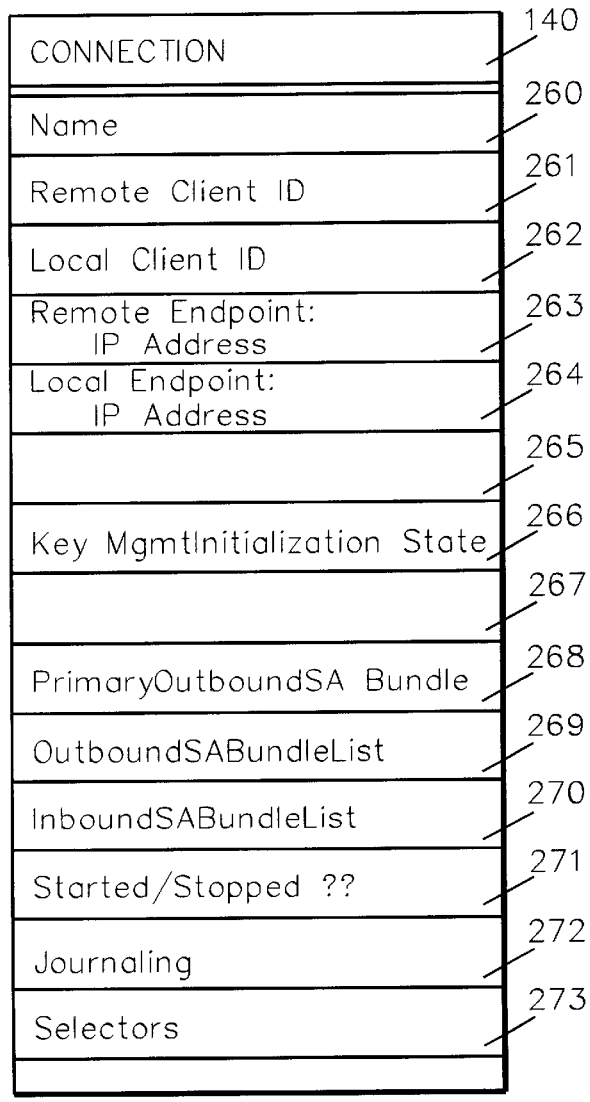
FIG. 11 illustrates the connection object of FIG. 9.
Figure 12:
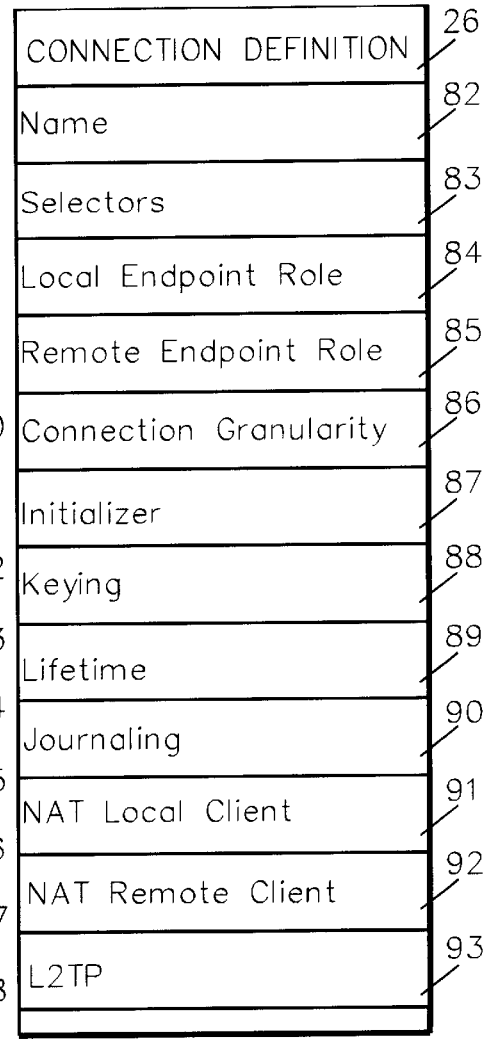
FIG. 12 illustrates the connection definition object of FIG. 9.
Figure 13:
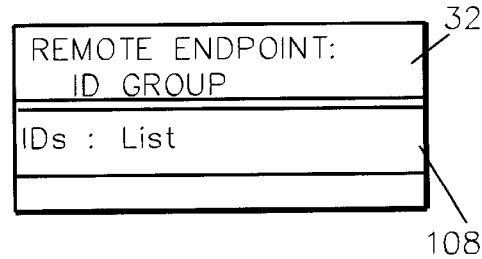
FIG. 13 illustrates the remote endpoint object of FIG. 9.
Figure 14:
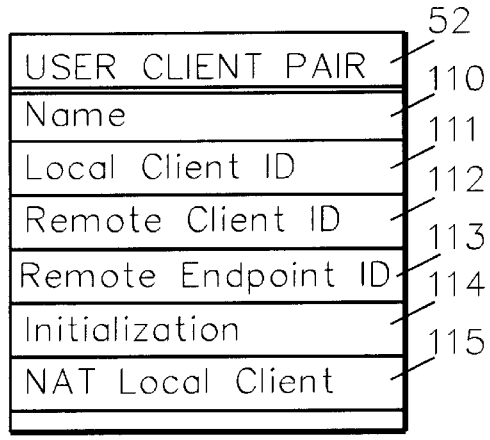
FIG. 14 illustrates the user client pair object of FIG. 9.
Figure 15:
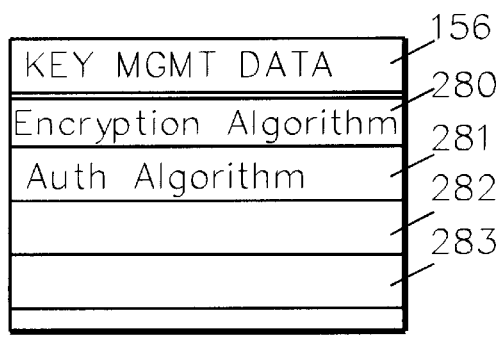
FIG. 15 illustrates the key management data object of FIG. 9.
Figure 16:
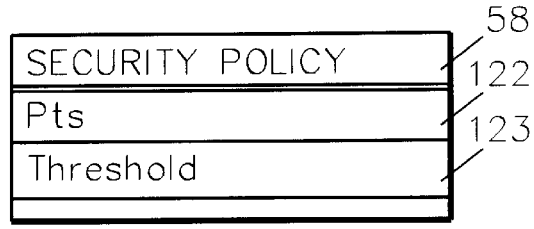
FIG. 16 illustrates the security policy object of FIG. 9.
Figure 17:
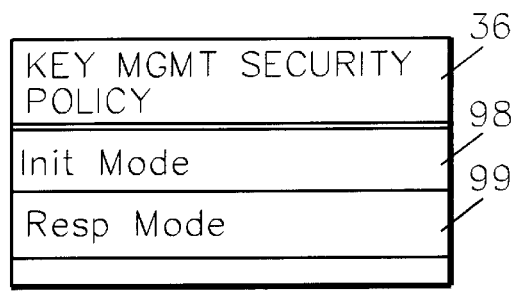
FIG. 17 illustrates the key management security policy object of FIG. 9.
Figure 18:
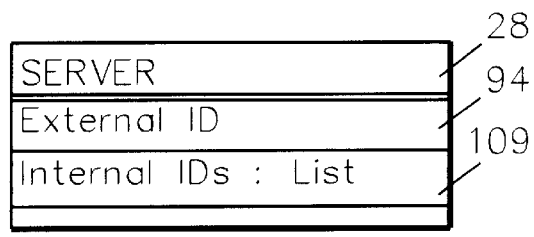
FIG. 18 illustrates the server object of FIG. 9.
Figure 19:
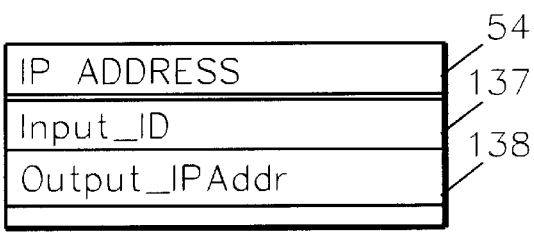
FIG. 19 illustrates the IP address object of FIG. 9.
Figure 20:
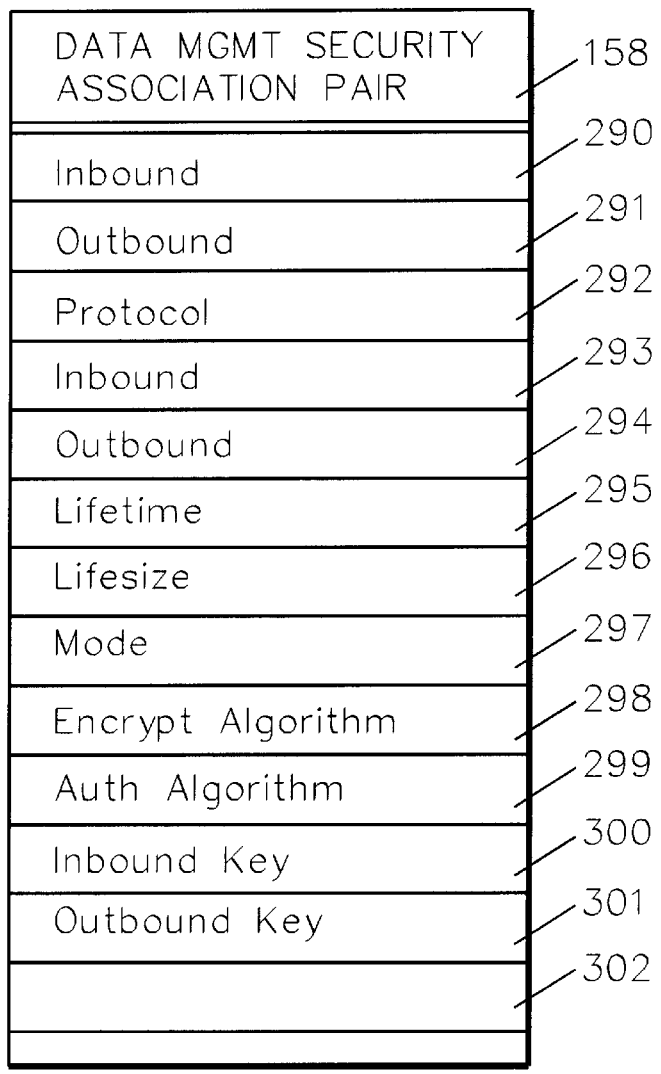
FIG. 20 illustrates the data management security association pair object of FIG. 9.

Referring to FIGS. 1 and 9, the preferred embodiment of the invention is set forth in object notation, based on the Object Model Technique (OMT) notation, which is described in. "Object-Oriented Modeling and Design", by Rumbaugh et al. In accordance OMT notation, the boxes represent data objects, showing their type (e.g. Connection Definition) and the attributes associated with this type of object. The lines represent association, specifically references. An arrowed line is a one-way reference. A line with no arrows implies a two-way reference. References are usually handled by keeping the name of the referenced object in the data of the referencer. For example, a Security Policy object has a reference to one Initiator Proposal List Object and a reference to one Responder Proposal List Object, but neither of the Proposal List objects 'know' who holds references to them (hence the arrowheads). The dots (or lack of) show multiplicity. No dot implies one and only one reference. An open dot implies either no reference or at most one reference. The black dot means any number of references (i.e. 0 or more). A black dot with numbers means only those number of references are allowed (e.g. 1+ means one or more; 2,4 means either 2 or 4). Some complex examples (from FIG. 9) that explain arrows and dots together: A connection definition may or may not have a reference to a security policy (depending on the keying attribute being dynamic), but if it does it only has one reference (hence the open dot). On the other hand, any number of connection definitions may reference a particular security policy (hence the black dot).

Referring to FIG. 1 in connection with FIGS. 2–8, the major objects comprising the preferred embodiment of the invention include VPN manager 162, command shipper facade 160, alarm clock 164, sending 166, receiving 172, commands 178, connection manager 168, CNAT object 170, connections 140, CState 176, Phase 2 SA collection 180, CS running 182, CS startup 184, CS init P2 188, CS refresh P2 190, CS error 192, CS stopping 186 ad CS running 182. These objects are interrelated as illustrated in FIG. 1 by relationships 371–387, in accordance with OMT notation, described above.

Referring to FIG. 9 in connection with FIGS. 10–20, the connection model of the preferred embodiment of the invention is set forth, again in OMT notation. The dotted line 71 represents the dividing line between database information 76 above the line, and instantiated connections 140 of VPN manager 162 below the line. Connections 140 exist when START or STARTED commands 178 are processed by VPN connection manager 168 and 'necessary and sufficient' information exists in database 76. Connection database 76 is further described in copending patent application, Ser. No. 09/239,693, entitled "System and Method for Managing Security Objects", and connections 140 are further described hereafter in connection with commands 178.

As is represented by association lines 116 and 119, connection definitions 26 and their associated anchor filters 20 form a 1 to 1 correspondence with connection objects 140. A connection definition 26 is a database entry which defines all attributes of this connection 140. As is represented by association line 35, connection definitions 26 require specification of a security policy 58 for dynamic key management, which establishes the phase 2 security associations 180. If a dynamic connection is to be started on this system, it also requires a user client pair 52. This system would then become the initiator for that connection. As is represented by association lines 31, 53 and 55, manual connections require specification of a user client pair 52 and the static security associations 46, 48, thus limiting manual connections to initiator only. The term 'manual' is used to denote the connection type based on the way the keying material is generated, (manual or dynamic), and 'static' to denote the keys do not change over time with manual connections. A user client pair 52 is a database entry which defines local and remote data endpoints. Configuration for mobile users requires establishment of deferred selector(s) 22. In all cases, it is necessary to specify remote endpoint/ local endpoint mappings 32, 34, and in the dynamic key connections, an associated key management policy 36 based on remote ID which establishes the phase 1 security associations 46, 48.

Figure 2:
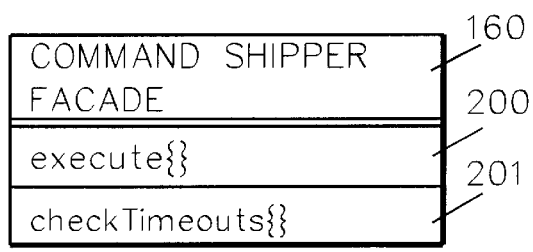
FIG. 2 illustrates the command shipper facade of FIG. 1.
Figure 5:
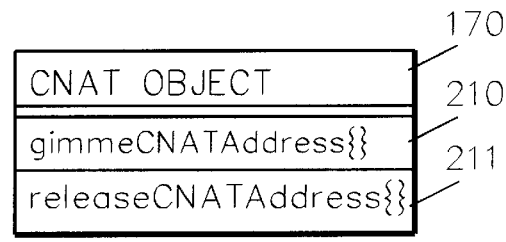
FIG. 5 illustrates the CNAT object of FIG. 1.
Figure 3:
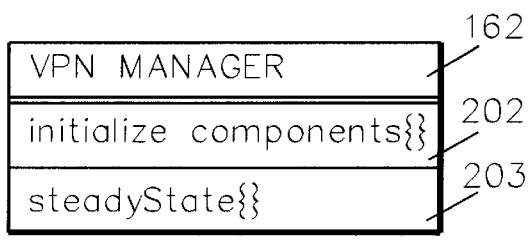
FIG. 3 illustrates the VPN manager object of FIG. 1.
Figure 6:
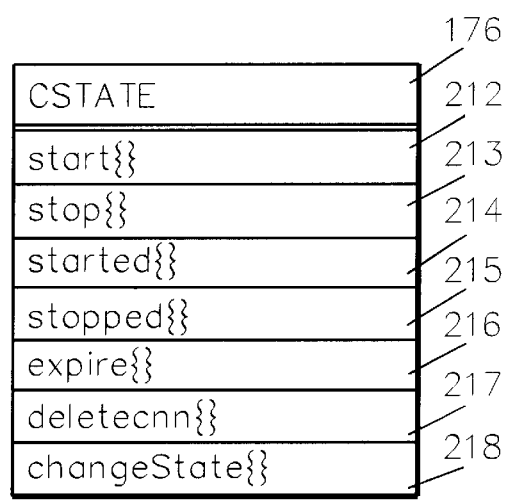
FIG. 6 illustrates the CSTATE object of FIG. 1.

Referring again to FIG. 1 in connection with FIG. 2, command shipper facade 160 provides the client VPN manager 162 interface to a command shipper (not shown), which delivers commands to the specified server (in essence, FIG. 1 in its entirety forms a VPNCNM server) and pairs request/response commands when appropriate. Command objects are generated and sent via object 166 as represented by association lines 373, 377 and 381, or received for execution via receiving object 172 as is represented by association lines 381, 377 and 374.

Figures 7, 8:
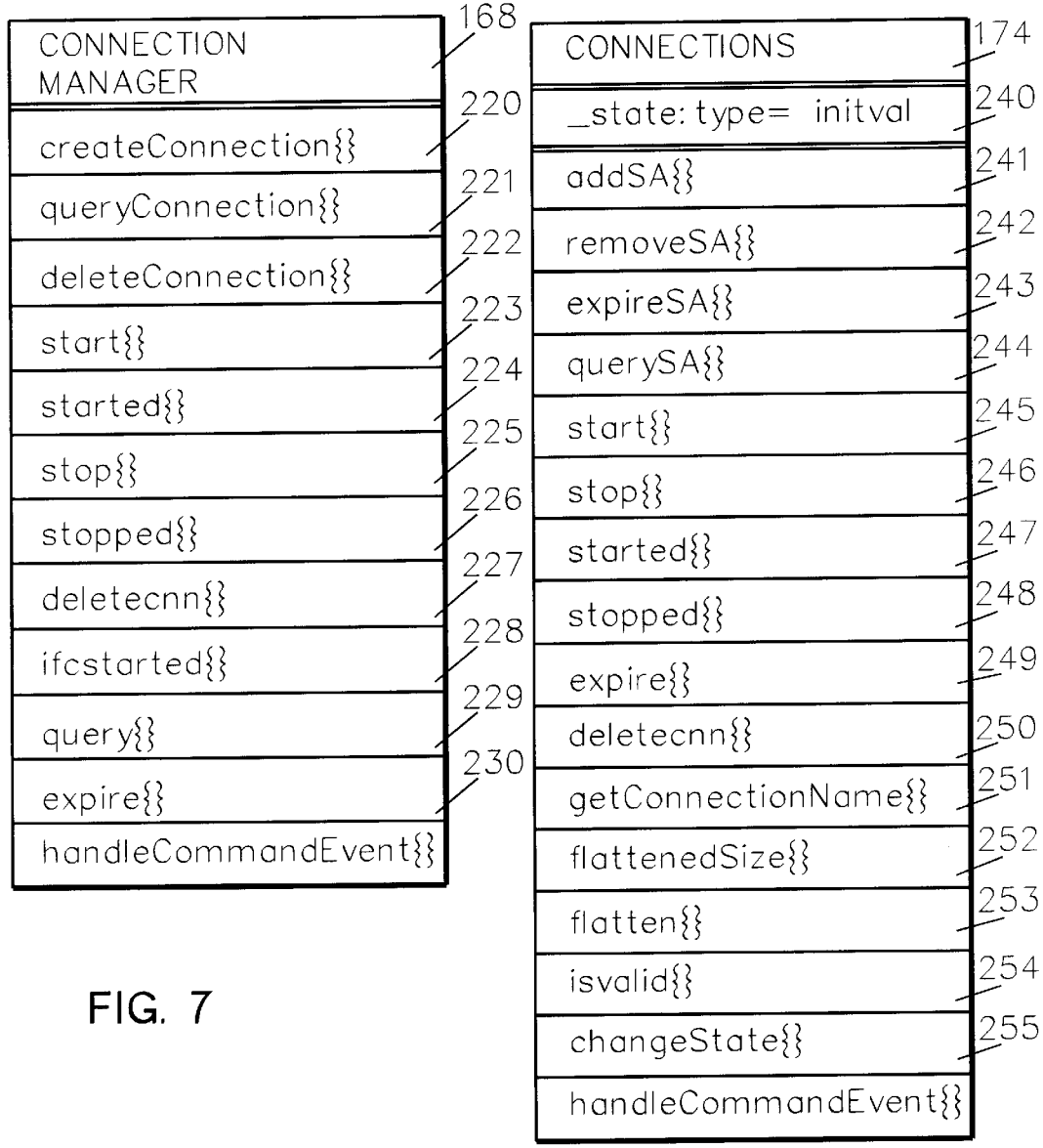
FIG. 7 illustrates the connection manager object of FIG. 1.
FIG. 8 illustrates the connection object of FIG. 1.

Referring to FIG. 1 in connection with FIG. 7, connection manager object 168 manages collections of connections 140, as is represented by association line 378. The creation, deletion, and updating of these connections 140 is done through the connection manager object 168. In addition, connection manager object 168 provides methods for executing a query command. These collections of connections 140 are associated with an interface or interfaces 142, as will be described hereafter. Connection manager object 168 queries connection definitions 26 across these connection collections 140, since it is possible for connections 140 to be spawned across multiple interfaces 142. The connection model and connections 140 will more fully described hereafter.

Figure 4:
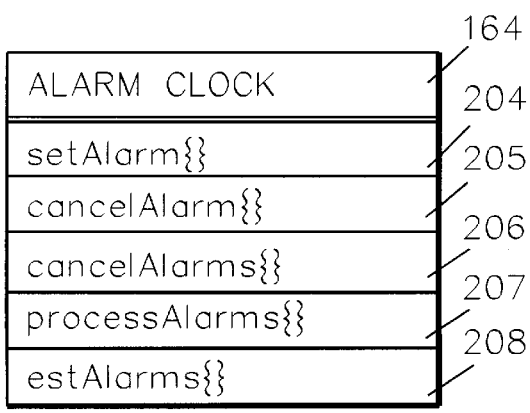
FIG. 4 illustrates the alarm clock object of FIG. 1.

Referring to FIG. 1 in connection with FIG. 4, alarm clock object 164 manages the timed expiration of security associations 180, connections 140, and the inter-relationship among them. Connections 140 and security associations 180 have a limited lifetime based on either a byte count threshold or timer threshold, and an unlimited number of security associations 180 and connections 140 may expire at any given time.

For each security association 180 or connection 140 that VPN manager 162 wishes to time, an alarm 164 is created with the connection name, the time to live (in seconds), and the type of timeout (hard or soft). Alarms are inserted into an alarm list by expiration time. The alarm( ) for a given job is set based on the next time an alarm object will expire. When the alarm goes off, the list of alarm objects is processed, and for the entry that causes this alarm an EXPIRE command is sent to the command shipper to be processed by connection manager 168. Also, when this alarm( ) goes off, a window of time is applied to existing alarm objects, and if any of those would expire within this window, additional EXPIRE commands are issued. Once EXPIRE commands are shipped, the alarm( ) is reset to the next expiration time needed from the alarm objects. If a new alarm object comes in with a shorter expiration time than what the alarm( ) is set to, the alarm is canceled and reset with the newer time. If the new alarm object has a time to live than is shorter than the threshold window, then an EXPIRE command is issued immediately.

When any key event that causes VPN connection manager 168 to do work arrives from the command shipper via facade 160, the following command process cycle is executed:

1. VPN manager 162, reads commands from the Command Shipper Facade 160 which executes( ) the command. The command inturn sends itself to the Connection Manager 168 using the handle CommandEvent( ) method. The Connection Manager then decides if this command should be passed on to a connection or if it needs other processing. If it determines it needs to be sent to a Connection 174, it first determines if the Connection for which this command is destined exists. If it does, it sends the command to the specific connection via the handle CommandEvent( ) method. The connection in turn will pass the command on to the current state object 176. If a connection does not exist for handling a connection specific command, the Connection Manager creates a connection object and passes the command along.

2. Depending on the command, there may be a single action that is triggered including interaction with other components, or there may be a series of actions that must take place. In all cases, the current state object 176 knows the correct processing given the current state and type of command.

3. Each command 220–230 is processed in its entirety. However, the command shipper allows a non-blocking interface wrt to be provided to other VPN components.

4. When the command has successfully completed its tasks, it will either run its destructor or be reused by the command shipper.

4. VPN Manager 162 awaits more work via command shipper facade 160.

VPN Manager 162 obtains commands from a command shipper (not shown) via facade 160 and executes them. In this regard, it functions like a server. In does not bind to a port and pass on protocol work, but it does process commands on behalf of clients. Clients in this context include the Connection Control LA API 412 and in the case of unsolicited STARTED commands, the IKE server.

Referring to FIG. 1 in connection with FIG. 8 and 9, connections 140 are created from connection definitions 26 and user client pairs 52, or connection definitions 26 (responder mode), and can be static or manually defined, or dynamic where security associations (SA) are negotiated.

Figure 21:
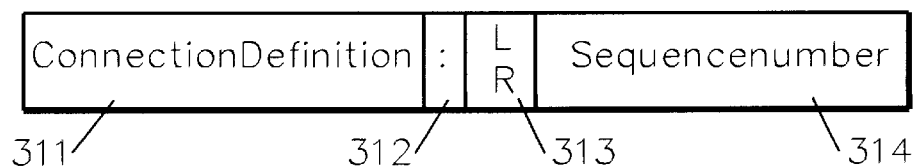
FIG. 21 illustrates the format of a connection name.

Referring to FIG. 21, in accordance with a specific embodiment of the invention, connections 140 are identified with a name 310 which includes a 32 character alphanumerics (no white space) connection definition 311 (max) input by the user, followed by a colon (:) 312, followed by an 'L' or 'R' for local or remote, that is which end of the connection owns the client IDs, followed by a sequence number 314 of up to six bytes long with no leading zeros.

Sample connection names, in a list indicative of connections that correspond to a connection definition 26 named George, and associated with George are at least three user client pairs 52 that were created and have a sequence number 314 associated with them, are:

George:L1
George:L2
George:L3
George:R1
George:R2

This connection definition 26 can also be used for responder mode, and in this case connections George:R1 and George:R2 were created. George:L1 and George:R1 are unique. Connection names 310 need to be unique across all connections 140 associated with a single connection definition 26. There is no guarantee that current connection sequence numbers 314 are continuous, nor associated chronologically. Sequence number 314 in the responder case will always increment, and may wrap over time. These start with numeral 1 and increment, for example, when an interface 142 starts. Sequence numbers 314 for initiators are generated by the VPN policy database 76 when user client pairs 52 are created. These sequence numbers 314 are then used in the connection name 310. That is, the following list of connections 140 associated with connection definition George could be:

George:L72

George:R468

George:L3

George:R2001

George:R88 and other sample connections 140 include:

Yggdrasill:L16

Thebehemoth:R468

MobileAOL:R55431

The sequence number 0 is special and reserved for use by IPSec.

If the role of the connection 140 is gateway (GW), then it is possible to connect the subnets of two different enterprises. (Role is obtained from the Connection Definition 26, both local Endpoint Role 84 and remote Endpoint Role 85.) When this happens, the chance of an address collision exists. Conventional NAT cannot be used to hide the address in this case, as NATed addresses are either not visible (that is, they are encrypted) or would cause authentication errors. Simply stated, conventional NAT breaks IPSec.

Therefore, as is more fully described in copending patent application, Ser. No. 09/240,720, entitled "System and Method for Network Address Translation Integration With IP Security", in order to solve the problem of address collision, C-NAT, aka NATWrap, is used. Pursuant to C-NAT, the natted addresses are always IDci and IDcr, or the client IDs. C-NAT does not apply to the connection endpoints, only to the data endpoints. IDci AND IDcr are ISAKMP terms, and are IDs the 'ci' is 'client intiator' and 'cr' is 'client responder'.

Referring to Table 1, the actions to be taken by VPN connection manager 168 when the role is gateway and any of the NAT flags are on are set forth. The indication of address NAT taking place has to be part of the connection 140, and it is imperative that it be given to IPSec.

TABLE 1

GATEWAY RESPONSE TO NAT FLAG

| MODE | IDci | IDcr |
|---|---|---|
| Initiator | type a: hide internal IP addresses, or prevent conflicts at destination address pool, NAT address before sending START to ISAKMP 410. | Not applicable |
| Responder | type c: NAT inbound IP addresses to prevent conflicts locally. Choose from available IP address pool, NAT address prior to doing a LOAD (connection) to IPSec. | type d: hide internal IP addresses and additionally could use this to provide load-sharing if a bank of servers were part of the NAT address pool. |

Table 2 provides descriptions for several data items used in describing the database and method objects of the invention.

TABLE 2

DATA ITEM DESCRIPTIONS

| Data Item | Description |
|---|---|
| Connection Definition | A database entry which defines all attributes of this connection. |
| CD name | Connection Definition (CD) for which SAs were generated. If in initiator mode, this will have a unique sequence number (that was previously sent). If in responder mode, this will have sequence number equal to zero, which is equal to a Connection Definition. |
| UserClient Pair | A database entry which defines local/remote data endpoints. |
| IP Address | Local IP address that has been assigned for this connection. |
| P2 SA collection | Phase 2 security associations (SAs) negotiated. |
| P1 SA information | Phase 1 used for Phase 2 negotiations. |
| Error Info | Dynamic Error Information. |
| Connection Name | Connection for which Security Associations were generated. If in initiator mode, this will have a unique sequence number (that was previously sent). If in responder mode, this will have sequence number 00000 (equal to a connection definition). |
| Selectors | IP packet information that will allow a database lookup to establish this connection. |
| Interface Name | Valid interface associated with this packet. |
| Set Value | Value of *ON or *OFF in a TRCTCPAPP command 390. |
| Inputparms | Character string that is optionally entered by the user. |

Separate address pools are required for each type of NAT (a:, c:, or d:). The available addresses from these address pools are managed by VPN connection manager 168. If no addresses are available, then an error message indicating so is returned in the type a: case to the connection control API. In either responder case, if no addresses are available, VPN connection manager 168 will not LOAD the connection and instead creates a connection object 140 and transitions it to the CsError State 192. In addition, a STOP is sent to ISAKMP 410.

Figure 22:
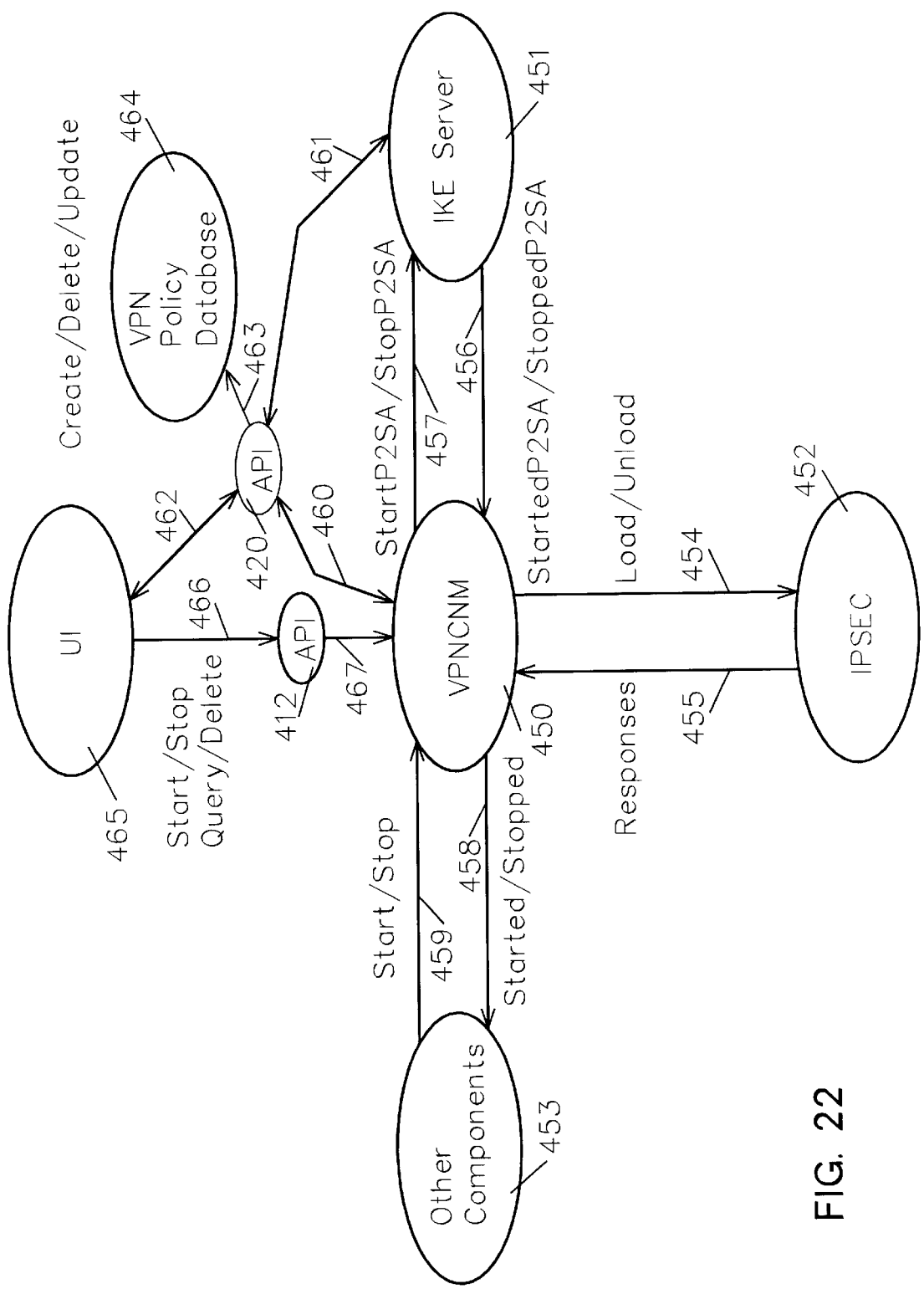
FIG. 22 illustrates the system environment in which the VPN-CM of the preferred embodiment of the invention executes.

Referring to FIG. 22, a systems view of a VPN solution is provided. It shows both the components that make up the solution and the interactions that exist between the components. The VPNCNM 450 is the VPN Connection Manager component that centralizes control of all VPN connections. API's 412 and 420 allow applications access to both the VPNCNM and the VPN Policy Database 464. The Connection Control API 412 (from FIG. 23) is used to Start, Stop, Delete, and Query connections via 466, 412, and 467. There is also a VPN Policy Database API 420 that allows creates, deletes and updates to the VPN Policy database via 462, 420 and 463; or 460, 420 and 463; or 461, 420 and 463. There is also a User Interface 465 that accepts input from the user and then makes use of the Connection Control API 412 or VPN Policy Database API 420 as necessary. In operation, for managing connections in a virtual private network, VPNCNM 450 responds to a request 466, 467 selectively to start or stop a VPN connection 140 (FIGS. 1 and 11) from a user application logged on to user interface 465 by determining if the user has first authority to use the start or stop connection command 178 (FIG. 1) and if the user has second authority to use connection control application program interface (API) 412. If the user has both authorities, VPNCNM 450 executes the request 466, 467.

An example scenario would include the User Interface 465 writing appropriate VPN policy to the VPN Policy Database 464 via 462, 420 and 463. A Start is then issued to the VPNCNM 450 via 466, 412 and 467. The VPNCNM 450 processes the Start message. There is sufficient information in the Start message to access the VPN Policy Database 464 via 460, 420, 463 and obtain policy information for this connection. If it is a manual connection, it will then transfer information to IPSEC 452 via a Load 454 and if successful, the VPN Connection is considered active.

If this connection is determined to be dynamic, the VPNCNM 450 will need to request security associations from the IKE Server 451 using a StartP2SA message 457. When the IKE Server has successfully negotiated an SA, it responds to the VPNCNM with a StartedP2SA message 456 and now VPNCNM will transfer information to IPSEC 452 via a Load 454 and if successful, the VPN Connection is considered active.

The Connection Control API 412 can start connections, and so can Other Components 453 in the system. An example would be a PPP server may need an IPSEC connection for any traffic flowing over it. In that case it would be able to issue a Start message identical to and as if it came from the Connection Control API 412.

Figure 23:
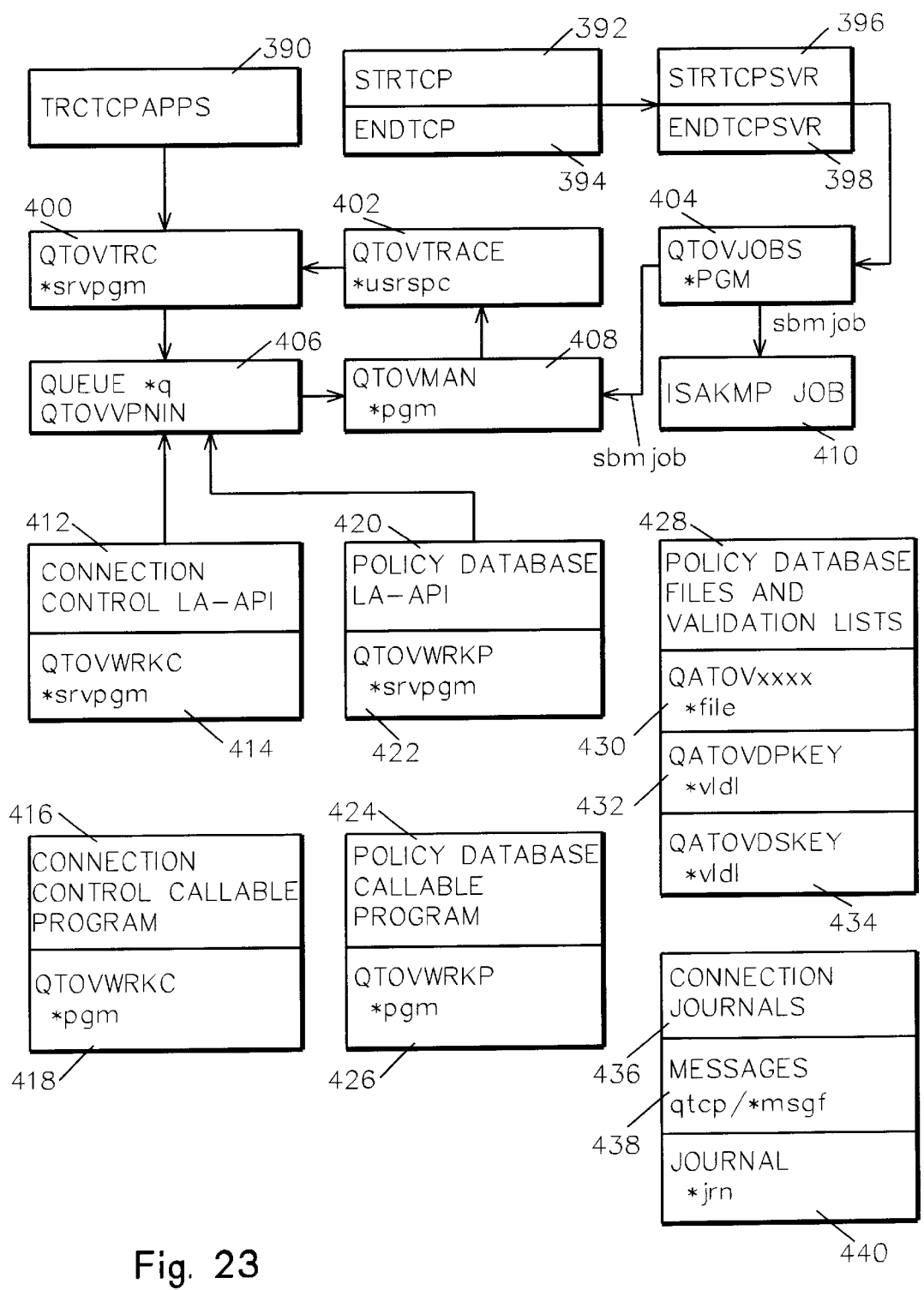
FIG. 23 illustrates system objects relevant to implementation of the preferred embodiment of the invention.

Referring to FIG. 23, system objects relevant to the implementation of the preferred embodiment of the invention include TRCTCPAPPS 390, STRTCP 392, ENDTCP 394, STRTCPSVR 396, ENDTCPSVR 398, QTOVTRC 400, QTOVTRACE 402, QTOVJOBS 404, QUEUE 406, VPNMGR 408, ISAKMP JOB 410, connection control API 412/414 and callable program 416/418, policy database API 420/422 and callable program 424/426, policy database files and validations lists 428, including QATOVxxx 430, QATOVDPKEY 432 and QATOVDSKEY 434, and connection journals 436, including messages 438 and journal 440.

VPN connection manager 168 commands sent to ISAKMP 410 include the following: START, which supplies connection and data endpoints, Phase 1 and Phase 2 policy management names, and expects a STARTED command returned with a uniquely named Phase 2 SA collection; and STOP, which supplies a uniquely named Phase 2 SA collection name and expects back a STOPPED command with a return code indicating success or failure.

VPN connection manager 168 commands include the following: STARTED, which supplies connection name and expects nothing back; and STOPPED, which supplies connection name expects nothing back.

VPN connection manager 168 commands sent to IPSec include the following: LOAD, which provides connection information including relevant SA information; and UNLOAD, which provides connection information.

In accordance with a specific embodiment of the invention, a QTOVMAN job starts, ends and configures VPN connection manager. VPN connection manager 168 is started by way of a STRTCP 392 command if the autostart attribute is YES. Additionally, VPN connection manager 168 and ISAKMP 410 are controlled via the start TCP server STRTCPSVR 396 and end TCP server ENDTCPSVR 398 commands by means of a new server value, *VPN. The QTOVMAN job runs in the system state system domain. Starting and ending of connection manager 168 is atomic with respect to STTCPSVR 396 and ENDTCPSVR 398 commands. Both VPN connection manager 168 and ISAKMP 410 will both start, or both end, with the command. The single QTOVJOBS 404 program ensures the starting or ending of both jobs, and any other condition is an error condition resulting in appropriate messages being generated and sent to a joblog.

The QTOVJOBS 404 program handles conditions where if either CM 168 or ISAKMP 410 job isn't started, the other job isn't started or is ended if already started. On invocation, the QTOVMAN job 408:

1. Determines if VPN manager 162 is already running, and if it is, logs a message and quits.
2. Initializes the command shipper. VPN Manager 162 calls an initialization routine which creates queues and data areas, such as the input queue (qtovvpnin) and common data areas (qtovgcs).
3. Reads the configuration file, if any configuration file exists.
4. Registers the queue *Q (qtovvpnin) 406 with QTOCMON, so as to enable receiving threshold notifications, and so forth.
5. Registers for journal messages from IPSec, providing a specific message id and appropriate queue name. Journaling is a standard way of collecting data on the AS/400. There is a flag in the connection definition 26 called Journaling 90. If this flag is turned on, entries are put in the connection journals 436.
6. Runs constructors for major objects, including connection manager 168.
7. At this point, VPN CM 168 is initialized. ISAKMP 410 is started the say way using a program object QTOVJOBS 404, much like any other TCPIP server.
8. Starts main loop processing, whereby VPN Manger 162 enters steady state where it is processing commands.
9. The QTOVMAN job which comprises (FIG. 1) is ended by the ENDTCP 394 or ENDTCPSVR 398 command. On exit, destructors are run on all objects, and the queue (QTOVVPNIN) 406 is deleted.

Advantages over the Prior Art

It is an advantage of the invention that there is provided a system and method for centrally managing connections in a virtual private network.

It is a further advantage of the invention that there is provided a system and method for centrally managing VPN connections with the ability (a) to control access to the resources necessary to start the servers that manage VPN connections, and to control access in the management of those VPN connections; and (b) to start, stop delete and query defined VPN connections on the system, including the ability to discover which connections should be started in a variety of ways.

It is a further advantage of the invention that there is provided a system and method for establishing (starting) an active VPN connection in a plurarlity of ways, including VPN connections using IPSec technologies for protection of IP datagrams.

It is a further advantage of the invention that there is provided a system and method for limiting these VPN connections to a particular lifetime, and for refreshing the keying material when VPN policy dictates it is time.

Alternative Embodiments

It will be appreciated that, although specific embodiments of the invention have been described herein for purposes of illustration, various modifications may be made without departing from the spirit and scope of the invention. In particular, it is within the scope of the invention to provide a program storage or memory device such as a solid or fluid transmission medium, magnetic or optical wire, tape or disc, or the like, for storing signals readable by a machine for controlling the operation of a computer according to the method of the invention and/or to structure its components in accordance with the system of the invention.

Accordingly, the scope of protection of this invention is limited only by the following claims and their equivalents.

We claim:

1. Method for managing within a single node a VPN connection in a virtual private network, comprising the steps executed within said single node of:

receiving a call at a connection control API, said call including a connection name, said connection name including connection definition;

operating said connection control API to create a command and place said command on an input queue for a connection manager;

creating a command object;

receiving and sending said command object to said connection manager;

operating said connection manager to search for said connection name within a list of connections; and, if said connection name is found within said list, passing said command to the current state object of an existing instance of a connection object; and if said connection name is not found within said list, creating, if possible, a new instance of a connection object and passing said command to the current state object of said new instance; else, if not possible, rejecting said command.

2. The method of claim 1, said command being a start VPN connection command.

3. The method of claim 1, said command being a stop VPN connection command.

4. The method of claim 1, said command being a delete VPN connection command.

5. Method for requesting information about an existing set of VPN connections in a virtual private network, comprising the steps of:

issuing to a connection control API a connection mask defining a set of instantiated connections;

operating said connection control API to create a query command and place said query command on an input queue for a connection manager;

creating a query command object;

receiving and sending said query command object to said connection manager;

operating said connection manager responsive to said query command object to identify matching connections matching said connection mask within a list of instantiated connections; and, returning to said connection control API information describing said matching connections.

6. Method for executing a start VPN connection command in a virtual private network responsive to the start of a physical communication device, comprising:

detecting said start of a physical communication device;

creating a start VPN connection command object;

sending said command object to said connection manager; and operating said connection manager to identify all user client pairs for said physical interface which are autostartable.

7. The method of claim 2, further comprising steps for realizing from said connection object an active VPN connection responsive to said start command, further comprising the steps of:

obtaining for this connection object the associated user client pair;

obtaining connection mode indicia from a connection definition information for this connection object;

responsive to said connection mode indicia being manual,
   obtaining first associated indicia including static security association information, local and remote connection endpoints, and local and remote data endpoints from a VPN policy database at this node;
   transferring said first associated indicia to an IPSec component; and if successful,
   transitioning a current associated state object to running state; and
   setting a timing alarm; and responsive to said connection mode indicia being dynamic,
   obtaining second associated indicia including remote connection endpoints, local and remote data endpoints, and associated phase II negotiation policy from said VPN policy database;
   obtaining a security association from an IKE server;
   transferring said second associated indicia and said security association to said IPSec component; and if successful,
   transitioning a current associated state object to running state; and
   setting said timing alarm.

8. Method for starting an active VPN connection responsive to a started command which includes security association information for this connection, comprising the steps of:

building a started command object;

sending said object to a connection manager;

operating said connection manager to determine if it has a connection object to receive said started command; and, if not, creating said connection object;

passing said started command object to said connection object;

operating said connection object to pass said started command object to a current state object;

obtaining from a policy database associated connection definition information for said this connection; and transferring said connection object and said associated connection definition information to a IP security module and, if the transfer is successful, transitioning a current associated state object to running state and setting a connection alarm.

9. Method of claim 8, further for stopping an existing active VPN connection, comprising the steps of:

determining if said connection object is manual or dynamic;

if manual, signaling to said IP security module that said connection object should be stopped and, if successful, deleting said command object and, if not successful, transitioning said current associated state object to error state; and if dynamic, signaling to said IP security module and IKE server that said connection object should be stopped and said security associations are no longer valid; and, if successful, deleting said connection object, and if not successful, signaling error.

10. Method for refreshing keying material in an active VPN connection, comprising the steps of:

operating a connection alarm object to place an expire command on a connection manager queue;

creating an expire command object;

passing said expire command object to said connection manager;

operating said connection manager to identify a corresponding connection;

passing said expire command to a current state object; and said current state object obtaining a new security association from an IKE server, transferring information to an IP security module and, if successful, transitioning to running state and setting a timing alarm and, if not successful, transitioning to error state.

11. Method for managing connections in a virtual private network, comprising the steps of:

receiving from an application a request selectively to start or stop a VPN connection;

determining if said application has first authority to use a start or stop connection manager command;

determining if said application has second authority to use a connection control limited application program interface (API); and responsive to determining that said application has both said first authority and said second authority, enabling said request to execute.

12. A program storage device readable by a machine, tangibly embodying a program of instructions executable by a machine to perform method steps for managing within a single node a VPN connection in a virtual private network, said method steps comprising:

issuing a call to a connection control API, said call including a connection name, said connection name including connection definition;

operating said connection control API to create a command and place said command on an input queue for a connection manager;

creating a command object;

receiving and sending said command object to said connection manager;

operating said connection manager to search for said connection name within a list of connections; and, if said connection name is found within said list, passing said command to the current state object of an existing instance of a connection object; and if said connection name is not found within said list, creating, if possible, a new instance of a connection object and passing said command to the current state object of said new instance; else, if not possible, rejecting said command.

13. An article of manufacture comprising:

a computer useable medium having computer readable program code means embodied therein for managing within a single node a VPN connection in a virtual private network, the computer readable program means in said article of manufacture comprising:

computer readable program code means for causing a computer to effect issuing a call to a connection control API, said call including a connection names, said connection name including connection definition;

computer readable program code means for causing a computer to effect operating said connection control API to create a command and place said command on an input queue for a connection manager;

computer readable program code means for causing a computer to effect creating a command object;

computer readable program code means for causing a computer to effect receiving and sending said command object to said connection manager;

computer readable program code means for causing a computer to effect operating said connection manager to search for said connection name within a list of connections; and, computer readable program code means for causing a computer to effect if said connection name is found within said list, passing said command to the current state object of an existing instance of a connection object; and computer readable program code means for causing a computer to effect if said connection name is not found within said list, creating, if possible, a new instance of a connection object and passing said command to the current state object of said new instance; else, if not possible, rejecting said command.

14. System for managing connections in a virtual private network, comprising:

means for receiving from an application a request selectively to start or stop a VPN connection;

means for determining if said application has first authority to use a start connection manager command;

means for determining if said application has second authority to use a connection control limited application program interface (API); and means responsive to determining that said application has both said first authority and said second authority, for enabling said request to execute.

15. A system for managing connections at a node in a virtual private network, comprising:

a single point of control for all IPSec tunnels and also for VPN connections at said node;

said single point of control being operable for starting and stoping manual and dynamic VPN connections, deleting connections that might have had errors associated with them, querying VPN connection status information on said connections, managing connection lifetimes, refreshing of keying material including re-negotiating dynamic security associations, and creating said connections when said node acting in a responder role.

16. Method for managing a VPN connection in a virtual private network, comprising the steps of:

issuing a call to a connection control API, said call including a connection name;

operating said connection control API to create a start VPN connection command and place said start VPN connection command on an input queue for a connection manager;

creating a command object;

receiving and sending said command object to said connection manager;

operating said connection manager to search for said connection name within a list of connections; and, if said connection name is found within said list, passing said start VPN connection command to the current state object of an existing instance of a connection object;

if said connection name is not found within said list, creating, if possible, a new instance of a connection object and passing said start VPN connection command to the current state object of said new instance; else, if not possible, rejecting said start VPN connection command;

realizing from said connection object an active VPN connection responsive to said start VPN connection command by:
  obtaining for this connection object an associated user client pair;
  obtaining connection mode indicia from a connection definition information for this connection object;
  responsive to said connection mode indicia being manual,
    obtaining first associated indicia including static security association information, local and remote connection endpoints, and local and remote data endpoints from a VPN policy database at this node;
    transferring said first associated indicia to an IPSec component; and if successful,
    transitioning a current associated state object to running state; and
    setting a timing alarm; and
  responsive to said connection mode indicia being dynamic,
    obtaining second associated indicia including remote connection endpoints, local and remote data endpoints, and associated phase II negotiation policy from said VPN policy database;
    obtaining a security association from an IKE server;
    transferring said second associated indicia and said security association to said IPSec component; and if successful,
    transitioning a current associated state object to running state; and
    setting said timing alarm.

\* \* \* \* \*